United States Patent [19]

Feher et al.

[11] Patent Number: 5,782,652
[45] Date of Patent: Jul. 21, 1998

[54] ELECTRICAL CONNECTOR ASSEMBLY FOR A MAGNET WIRE

[75] Inventors: Michael Scott Feher, Steelton; Edward John Howard, Millersburg; Nelson Edward Neff, Hershey, all of Pa.

[73] Assignee: The Whitaker Corporation, Wilmington, Del.

[21] Appl. No.: 652,220

[22] Filed: May 23, 1996

[51] Int. Cl.$^6$ ............................................. H01R 4/24
[52] U.S. Cl. ........................ 439/417; 310/71; 439/398; 439/926
[58] Field of Search ........................ 439/417, 92, 398, 439/544, 926; 310/71

[56] References Cited

U.S. PATENT DOCUMENTS

| | | | |
|---|---|---|---|
| 4,066,321 | 1/1978 | Villazon | 439/398 |
| 4,392,012 | 7/1983 | Nattel | 439/92 |
| 4,649,304 | 3/1987 | Atherton et al. | 310/71 |
| 4,656,378 | 4/1987 | Atherton et al. | 310/71 |
| 4,851,725 | 7/1989 | Keck | 310/71 |
| 5,009,612 | 4/1991 | Rishworth et al. | 439/417 |
| 5,015,894 | 5/1991 | Crow et al. | 310/71 |

OTHER PUBLICATIONS

AMP Incorporated, Magnet Wire Terminals (Amplivar and Mag–Mate) Catalog 82221 Oct. 1991.
AMP Automachine and General Products Catalog Oct. 1993.

*Primary Examiner*—J. J. Swann
*Attorney, Agent, or Firm*—Mary VanAtten; Robert Kapalka

[57] ABSTRACT

The invention comprises an electrical connector assembly having a wire housing with a wire contact disposed therein. The wire contact has two ends, one of the ends having insulation displacing slots for receiving a magnet wire therein, the other of the ends having a resilient contact finger. The assembly further includes a connector housing having a tab contact disposed therein. The tab contact has a poke-in tab and a contact tab for mating with a matable connector. The wire housing is matable with the connector housing, the poke-in tab engages the resilient contact finger to provide electrical connection therebetween and to provide electrical connection between the magnet wire and the matable connector.

10 Claims, 7 Drawing Sheets

ELECTRICAL CONNECTOR ASSEMBLY FOR A MAGNET WIRE

FIELD OF THE INVENTION

The invention is directed toward an electrical connector assembly for providing electrical connection to magnet wires.

BACKGROUND OF THE INVENTION

Magnet wires are typically connected to terminals having insulation displacement slots. One such terminal is the terminal from the MAG-MATE electrical connectors produced by AMP Incorporated. The terminals have two insulation displacement slots which cut through the tough outer varnish coating on the magnet wire providing good electrical connection to the magnet wire. The MAG-MATE terminal can either then have a leaf spring contact to electrically connect with a mating terminal or, alternatively can have an integral tab contact extending in the opposite direction for electrically connecting with a receptacle terminal. These terminals are typically terminated to the magnet wire by a machine which inserts the terminal into the housing, terminates the wire to the terminal, and cuts off excess wire which extends beyond the face of the housing.

What is needed is an assembly which allows the magnet wire to be connected to the insulation displacement terminal and then can be connected to a right angle tab terminal to provide electrical connection to a matable connector. What is also needed is an assembly wherein the magnet wires can first be connected to the insulation displacement terminal before providing connection to the tab terminals which are installed in a connector in the motor housing and out of the way of the crimping termination area for the magnet wire.

SUMMARY OF THE INVENTION

The invention comprises an electrical connector assembly having a wire housing with a wire contact disposed therein. The wire contact has two ends, one of the ends having insulation displacing slots for receiving a magnet wire therein, the other of the ends having a resilient contact finger. The assembly further includes a connector housing having a tab contact disposed therein. The tab contact has a poke-in tab and a contact tab for mating with a matable connector. The wire housing is matable with the connector housing, the poke-in tab engages the resilient contact finger to provide electrical connection therebetween and to provide electrical connection between the magnet wire and the matable connector.

BRIEF DESCRIPTION OF THE DRAWINGS

Embodiments of the invention will now be described by way of example with reference to the accompanying drawings in which.

DETAILED DESCRIPTION OF THE INVENTION

Figure 1:
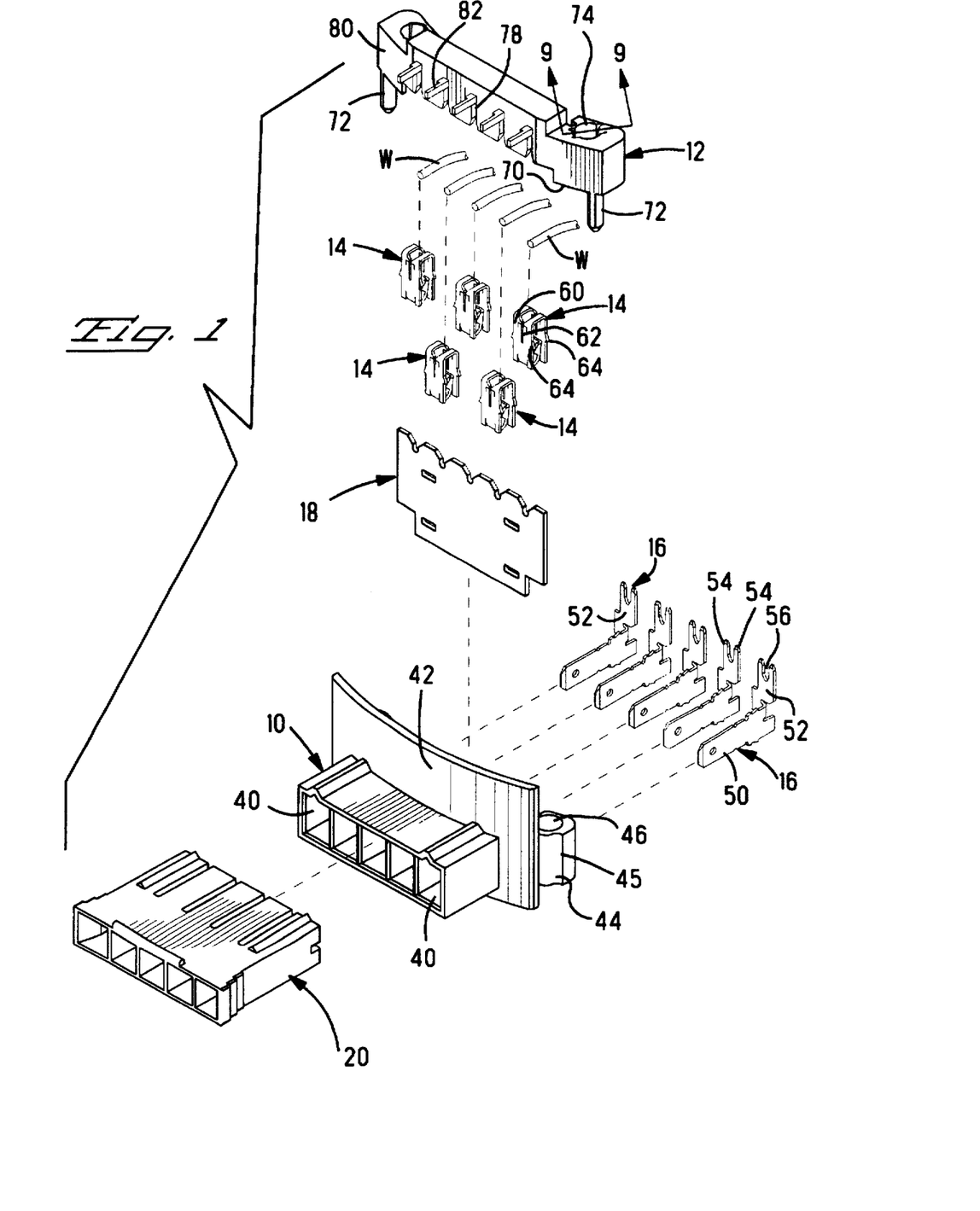
FIG. 1 is an exploded isometric view of the electrical connector assembly of the present invention.

FIG. 1 shows an exploded view of the connector assembly of the current invention. The connector assembly comprises a first connector housing 10. The connector housing 10 is designed to mate with a matable connector 20. The matable connector has contacts therein to provide a mating connection with the connector housing 10, not shown. Within the connector housing, there are received poke-in tab terminals 16. The tab terminals 16 will be electrically connected with the matable contacts within the mating connector 20. The assembly also includes a second, wire housing 12 which is designed to receive the insulation displacement terminals 14 of the MAG-MATE electrical connectors. The insulation displacement terminals 14 will be electrically connected to the magnet wires W by displacing the tough outer varnish coating of the magnet wire W. The assembly also includes a ground shield 18 to protect the electrical connector assembly from the magnet wire of the motor windings.

Figure 2:
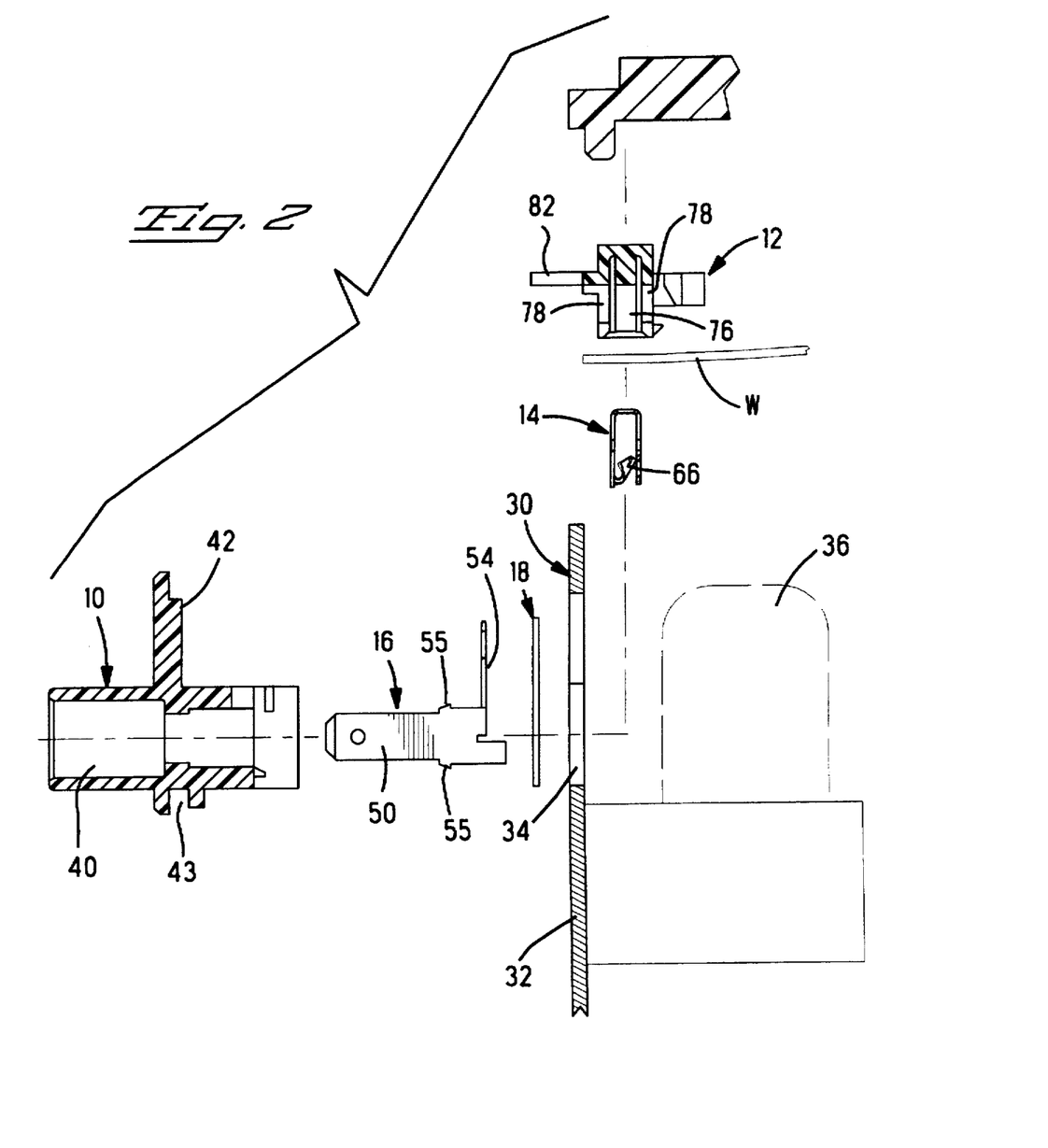
FIG. 2 is an exploded cross sectional view showing the components of the electrical connector assembly.

The electrical connector housing 10 is designed to be secured within walls 32 of a motor housing 30, as is shown in FIG. 2. The walls 32 of the motor housing have a recess 34 into which the electrical connector housing 10 is received and secured. The motor housing also includes the magnet wire windings 36 which includes the magnet wires intertwined in order to form the motor.

The electrical connector 10 has contact receiving passages 40 designed to receive the tab terminal 16. The contact receiving passages 40 have a forward portion which is designed to accommodate the mating connector 20. The contact receiving passages also have a rearward portion which will be used to secure the tab terminal 16 within the connector housing 10. The contact housing 10 also has a wall 42 which will be received along side the recess 34 of the motor housing 30. The contact housing 10 has a recess 43 along the bottom which is received over the wall 32 within the recess 34 to align and secure the contact housing 10 within the recess 34. The connector housing 10 further has flanges 44 with recesses 46 to receive splice as will be described more fully hereinafter.

The tab terminal 16 is designed to be received within the connector housing 10 and has a tab contact portion 50 and a tab poke-in portion 52, as is shown in FIG. 1. The tab contact portion 50 is designed to mate with a matable contact such as one which would be disposed within the matable connector 20. Along the tab contact portion are also barbs 55. The barbs 55 will dig into the walls of the contact receiving passage within the contact housing 10 thereby securing the tab terminal 16 within the contact receiving passage 40. The tab poke-in portion 52 has two legs 54 with a recess 56 therebetween. The purpose of the two legs in the recess will be described more fully later. When the tab terminal 16 is blanked out, the tab contact portion and the tab poke-in portion are in the same plane with each, however, the tab contact portion is directed 90 degrees from the tab poke-in portion. When the tab terminal 16 is then stamped and formed, the tab contact portion 50 is then twisted 90 degrees from its initial position so that the tab contact portion is directed 90 degrees away from the tab poke-in portion in both directions. The poke-in portion has a mating direction and the tab contact portion is directed 90 degrees both from the mating direction of the poke-in tab portion and also it is directed 90 degrees outside of the plane of the poke-in tab portion.

The insulation displacement terminal 14 is of standard construction and well known in the art. The insulation displacement terminal 14 is generally a box shaped terminal having legs 60 with a slot 62 therebetween. The slot 62 is disposed on both sides of the box shape of the terminal 16. Further, the terminal has barbs 64 which are used to secure the terminal within the second housing 12 as will be described more fully hereinafter. The IDC terminal 14 has a receptacle for tabs which includes a leaf contact 66 which is shown more fully in FIG. 2. The leaf contact 66 is a resilient spring contact designed to resiliently engage the poke-in portion 52 of the tab terminal 16 providing both good electrical contact and good wiping action against the poke-in portion 52.

The second electrical connector housing 12 has a bottom face 70 with alignment posts 72 extending therefrom. The alignment posts align the second housing 12 with the connector housing 10 and with the wall of the motor housing thereby assuring proper electrical connection. The alignment posts 72 engage niche 45, shown in FIG. 1, on flange 44 to provide proper alignment. The second housing 12 further has a splice receiving recess 74 which will be described more fully hereinafter.

The housing 12 has contact receiving openings 76 which are shown more clearly in FIG. 2. The contact receiving openings have slots 78 which extend along the front and rear face of the second housing 12. The slots 78 provide access for the magnet wire W to be received within the contact receiving openings 76. Extending from the front face 80 of the second housing 12 and aligned with the slot 78 is wire tie off post 82. The wire tie off post 82 provides a guide for the wire W as it is inserted into the slot 78 and into the contact receiving opening 76. The terminal is typically inserted into the housing and terminated to the wire by a machine. Upon termination of the IDC terminal 14 with the magnet wire W within the housing 12, the wire tie off post 82 is cut from the housing 12 at the same time as the end of the magnet wire W that extends from the front face 80 of the housing is also cut thereby keeping a smooth front face 80 so that it can be properly aligned with the connector housing 10.

Figure 3:
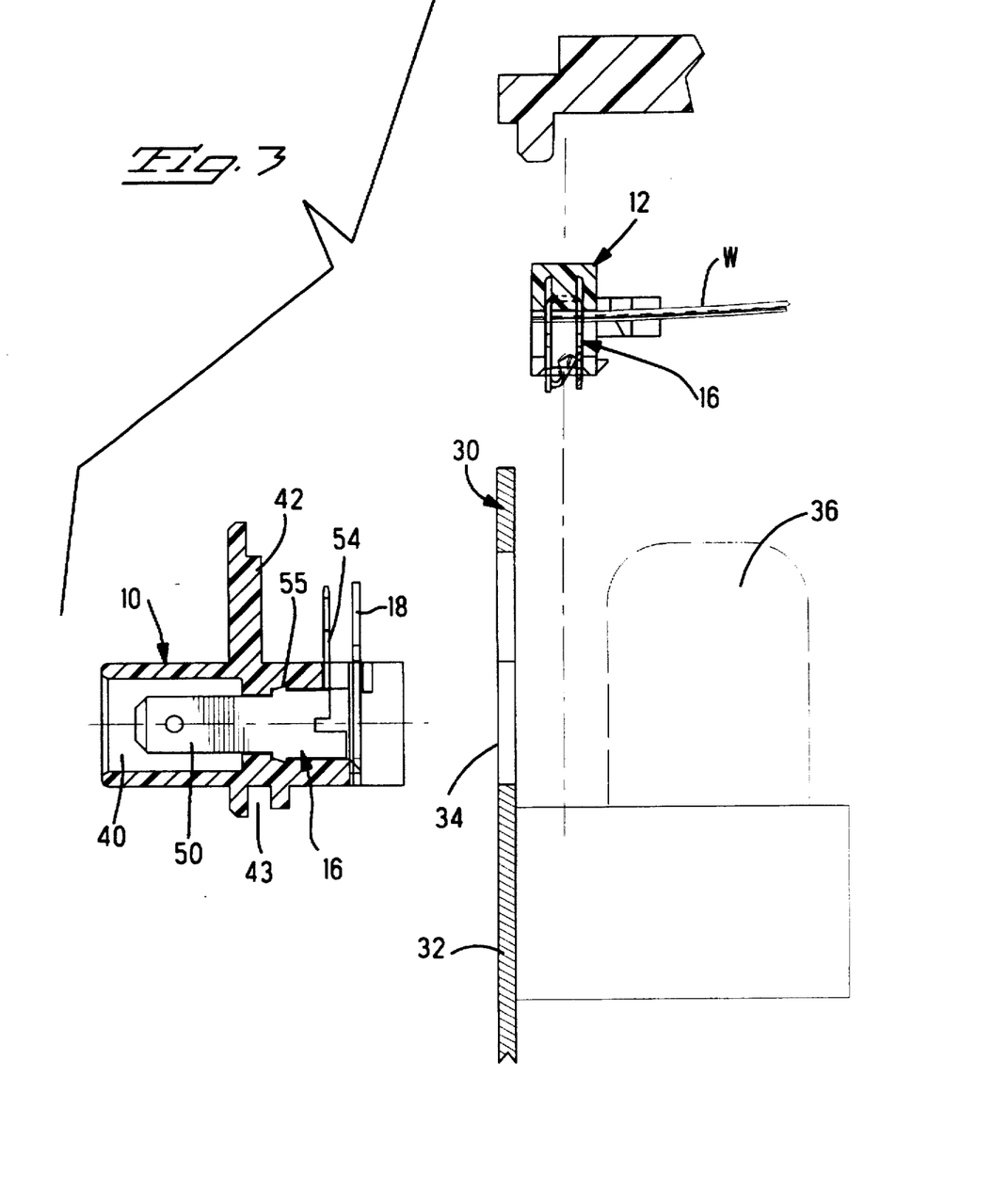
FIG. 3 is a cross sectional view showing the terminals installed within their prospective housings.

FIG. 2 shows a cross sectional view of the assembly of the electrical connector assembly. The tab terminal 16 is pushed into the contact receiving passages 40 of the connector housing 10. The barbs 55 on the tab terminal 16 engage the walls of the contact receiving passageway 40 biting into the walls and thereby securing the tab terminal 16 within the contact receiving passageway 40 as is shown in FIG. 3. When the tab terminal 16 is secured within the contact receiving passageway, the tab contact portion 50 extends into the front portion of the contact receiving passageway so it is accessible to mate with the matable connector 20. The tab poke-in portion 52 extends upwardly from the connector housing 10 out of the contact receiving passageway so that it is accessible for mating with the IDC terminal 14.

Figure 4:
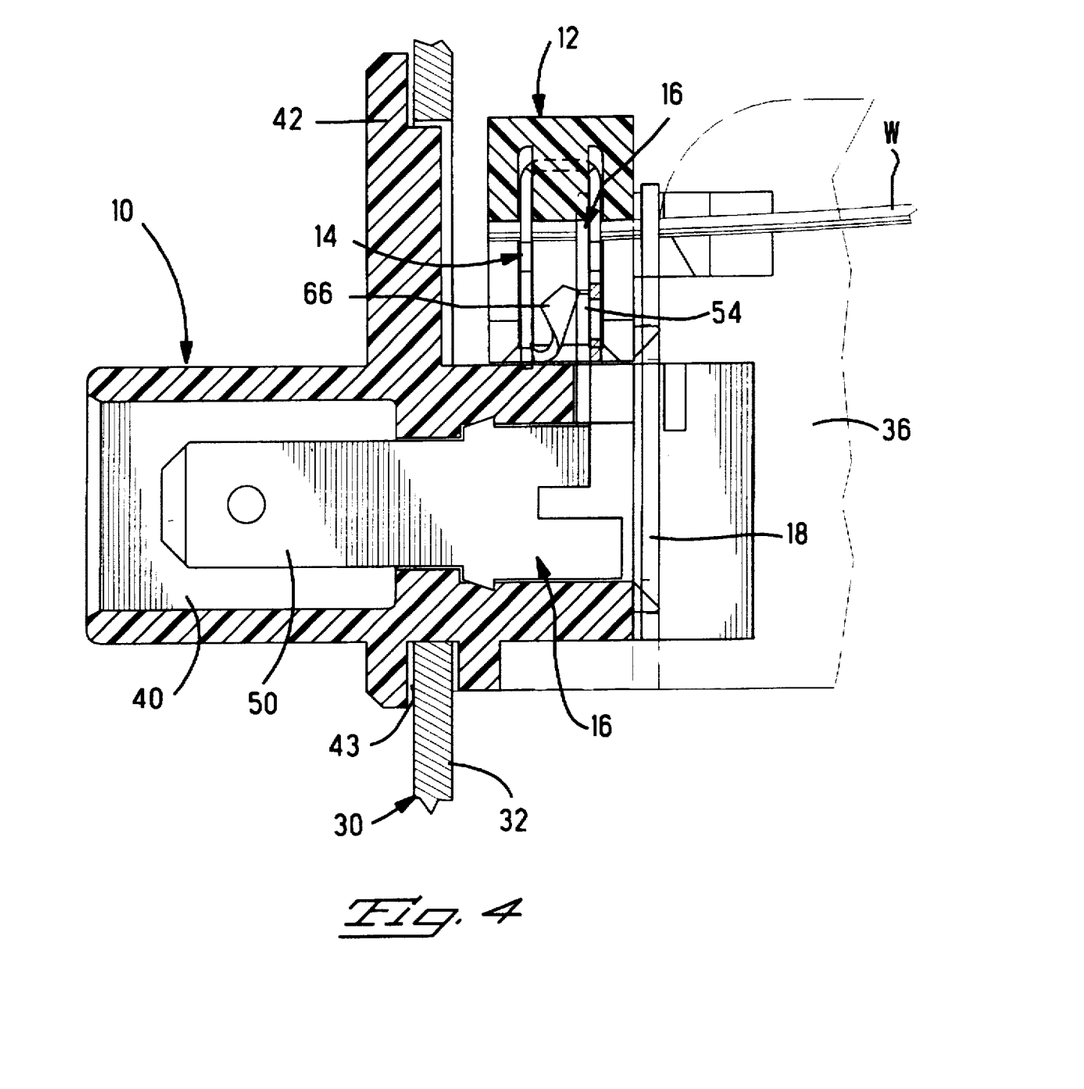
FIG. 4 is a cross sectional view showing the fully assembled electrical connector assembly.

FIG. 2 also shows the insertion of the IDC terminal 14 into the second housing 12. The magnet wire W is first received within the contact receiving opening 76 through the slot 78. The IDC terminal 14 is then inserted by a machine into the opening hereby terminating the IDC terminal to the magnet wire W. At the same time, the wire tie off post 82 and any excess magnet wire W that extends beyond the end of the second housing 12 is cut off by the termination machine as is shown in FIG. 3. The completed assembly is shown in FIG. 4. The connector housing 10 is secured within the recess 34 on the motor housing 30. The second housing 12 is then pushed down on top of the connector housing 10 thereby inserting the poke-in tab portion 52 of the tab terminal 16 into engagement with the leaf contact section of the IDC terminal 14 thereby providing electrical connection between the IDC terminal and the tab terminal. Also, the ground shield 18 is received along the back face of the connector housing 10 thereby protecting the connector assembly from the windings 36 of the motor housing 30.

Figure 5:
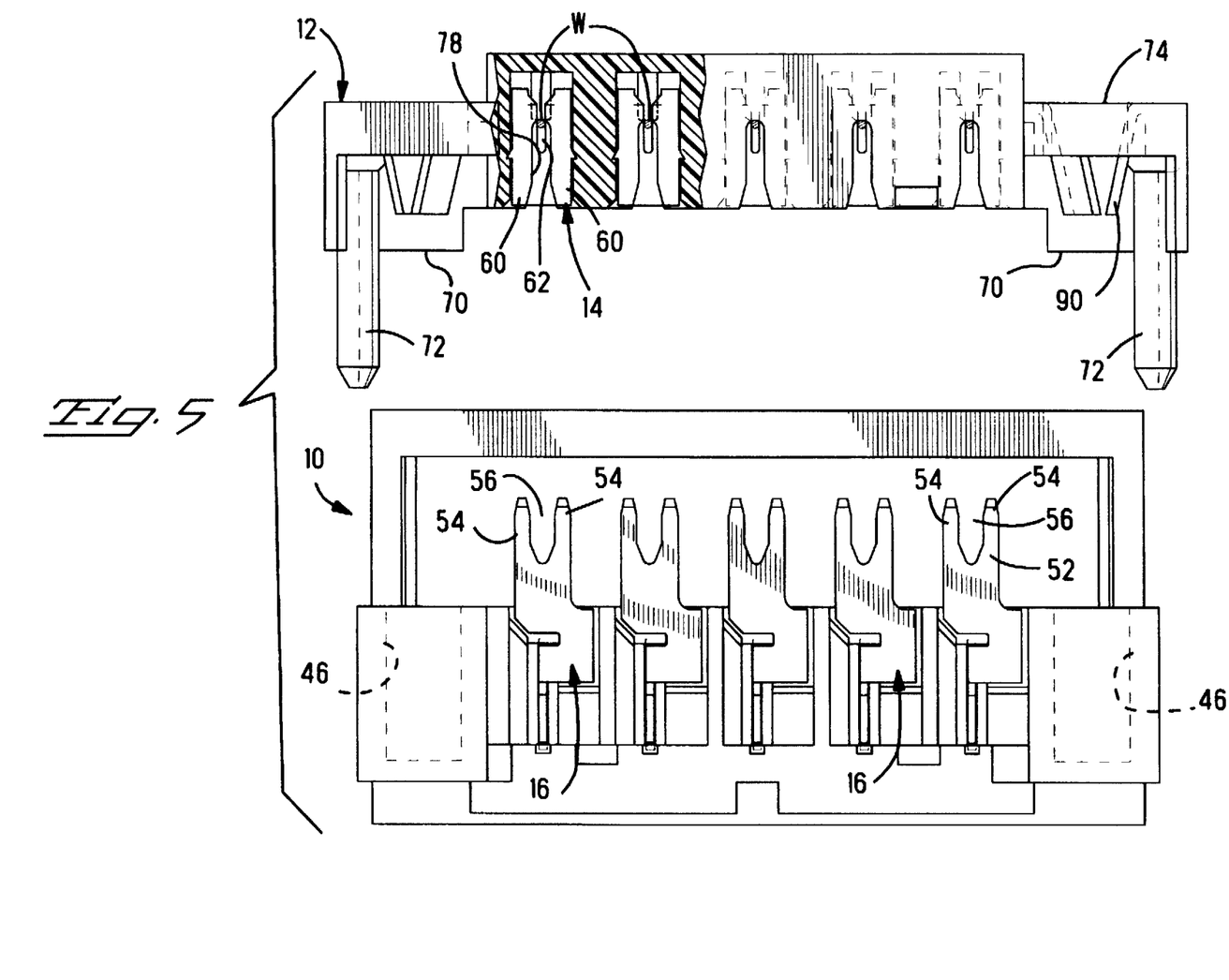
FIG. 5 is a rear view of the electrical connector assembly showing the insulation displacement terminals and the poke-in tab terminals.
Figure 6:
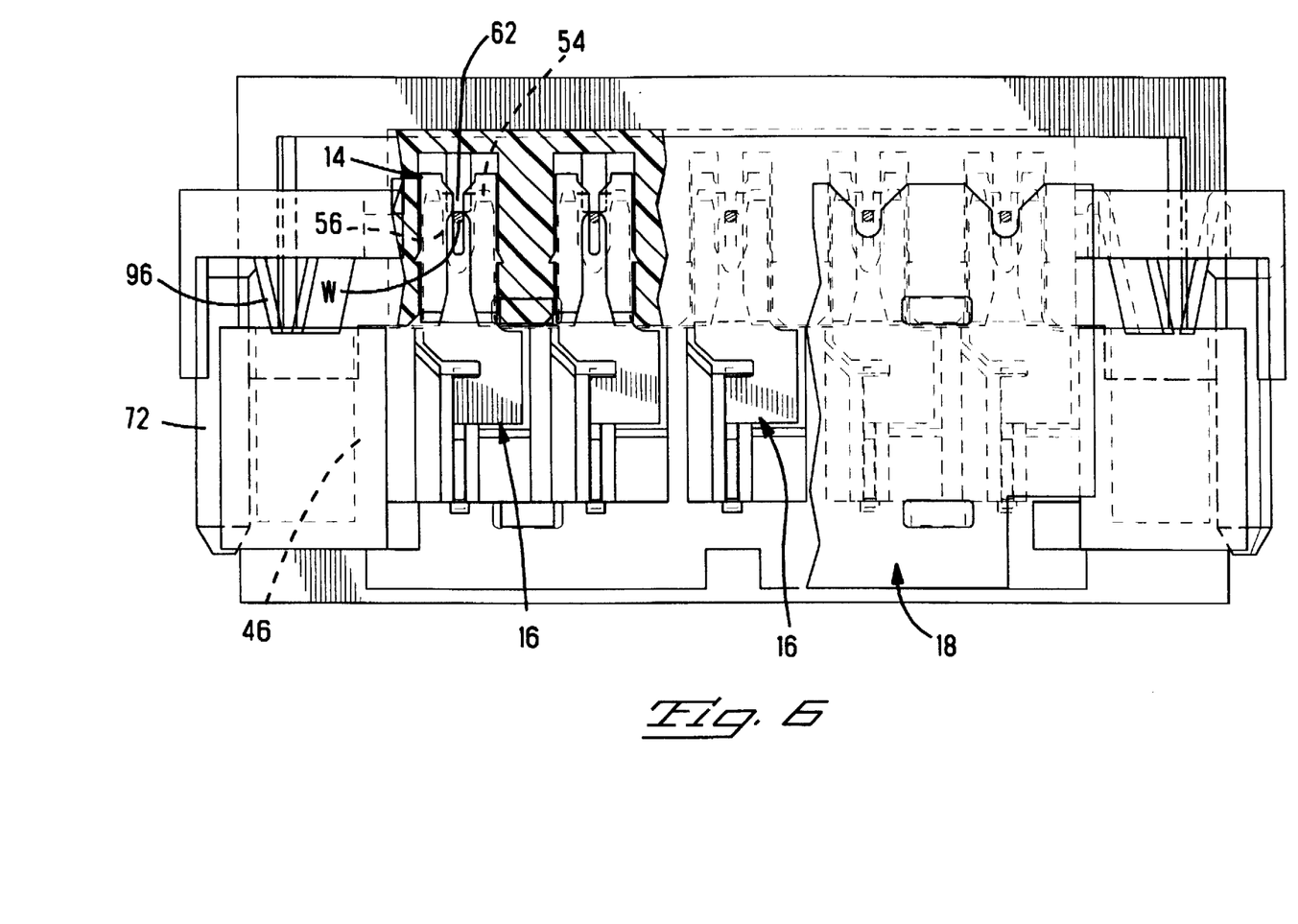
FIG. 6 is a rear view showing the insulation displacement terminals connected to the poke-in terminals.

FIG. 5 shows a rear view of the connector assembly of the present invention without the shield. The poke-in portion 52 of the tab terminal 16 extends upwardly along the back face of the connector housing 10. The legs 54 of the poke-in portion 52 are received up within the IDC terminal providing electrical connection with the leaf contact 66. The recess 56 allows the wire to be received between the legs 54 of the poke-in portion. FIG. 6 shows a rear view of the mated connector housing 10 and second housing 12. Here it is obvious that the legs 54 allow the poke-in portion to be received up within the IDC terminal providing good contact with the leaf contact 66 while also fitting around the magnet wire W.

Figure 7:
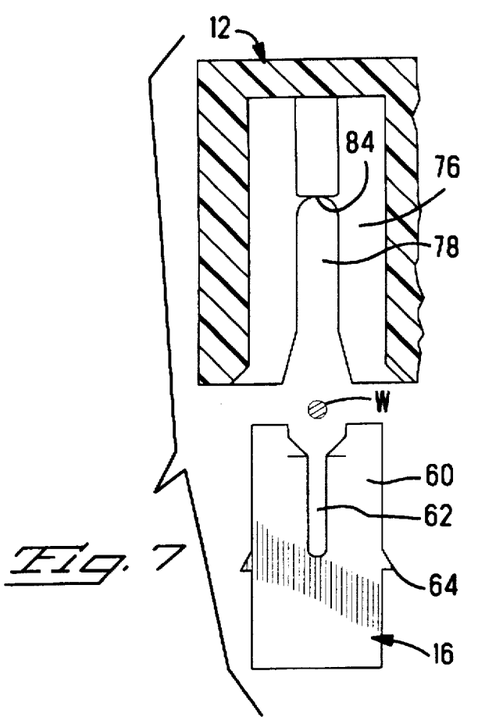
FIGS. 7 and 8 are cross sectional views showing the termination of the magnet wire with the insulation displacement terminal.
Figure 8:
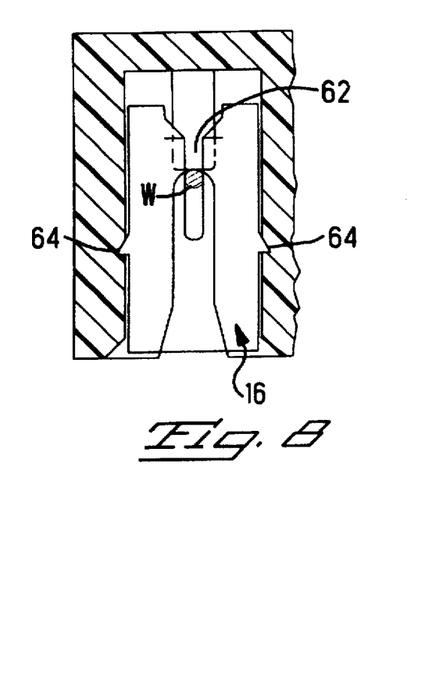

FIG. 7 and 8 show how the IDC terminal 14 is to be terminated to the magnet wire W within the contact receiving opening 76. In contact receiving opening 76, there is a shelf 84. The shelf 84 is aligned with the slots 78. Therefore, when the magnet wire W is inserted into the slot 78, the magnet wire comes to rest on top of the shelf 84. The slots 78 maintain the magnet wire alignment between the slots and on the shelf. The IDC terminal is then inserted into the contact receiving opening 76. The magnet wire is received through the slots 62 on the IDC terminal 14. The arms 60 penetrate the outer tough varnish coating of the magnet wire providing good electrical contact therein. The barbs 64 eat into the walls of the contact receiving opening 76 thereby securing the IDC terminal 14 within the housing.

Figure 9:
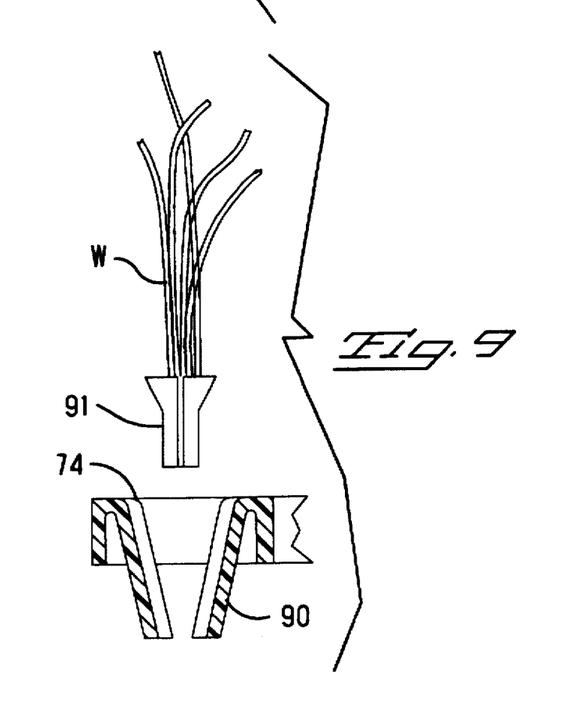
FIG. 9 is a cross sectional view showing the splice retainer slot.
Figure 10:
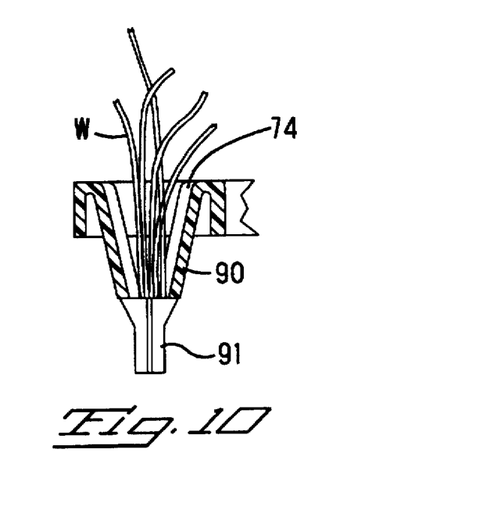
FIG. 10 is a cross sectional view showing the splice retainer slot with a magnet wire splice installed within the slot.

FIGS. 9 and 10 in conjunction with FIG. 5, show the detail of the splice receiving recess 74. Within the windings of a motor, it is often necessary to splice a few of the magnet wires together. Rather than have the spliced wires loose within the motor housing, it would be an advantage to have a place to secure this splice. The splice receiving opening 74 is an opening to the top face of the second housing 12. From the opening there are two fingers 90 which extend inwardly from the top space of the second housing. These fingers are directed toward each other and have some resiliency. FIG. 9 shows a series of magnet wires W which have been spliced together with splice connector 91. When the splice connector 91 is inserted into the recess, the splice connector cams the fingers 90 outwardly until the splice connector 91 is received beyond the fingers. The resilient fingers 90 then resile back to their normal position catching the side of the splice connector 91 thereby securing the splice connector within the recess. The fingers then keep the magnet wires and the splice secure without allowing it to move about within the motor housing. The fingers 90 and the splice are received within the recess 46 on the connector housing 10 when the second housing and the first connector housing are secured together thereby keeping the magnet wires and the splice connector secured within the connector assembly.

The advantages of the present invention are that the magnet wires can be connected to the IDC terminal independent of the rest of the connector housing and prior to installing the connector housing to the walls of the motor housing. This gives the operator more flexibility in how to operate the machinery when terminating the magnet wires to the IDC terminals. Further, the use of the combination of one IDC terminal and tab terminal allows the magnet wires to be terminated and then be connected to a tab terminal which gives a direction for connection which is 90 degrees from the IDC terminal in both directions. If this terminal were made as one continuous piece, it would be impossible to terminate the IDC terminal to the magnet wires while having the tab terminal pointing off in the same direction as the magnet wires and still cutting off any residual excess magnet wires that extend beyond the connector housing. The tab contact portion of the terminal would extend in the same direction as the strain relief thereby preventing the machine from cutting off excess magnet wire and the strain relief. The use of two housings allow the magnet wire to be first terminated to the IDC terminal and then connected to the right angle contact to allow the proper mating direction.

The connector assembly of the present invention and many of its attendant advantages will be understood from the foregoing description. It is apparent that various changes may be made in the form, construction, and arrangement of parts thereof without departing from the spirit or scope of the invention, or sacrificing all of its material advantages.

What is claimed is:

1. An electrical connector assembly, comprising:

a wire housing having a wire contact disposed therein, the wire contact having two ends, one of the ends having insulation displacing slots for receiving a magnet wire therein, the other of the ends having a resilient contact finger;

a connector housing having a tab contact disposed therein, the tab contact having a poke-in tab and a contact tab for mating with a matable connector;

the wire housing being matable with the connector housing wherein the poke-in tab engages the resilient contact finger to provide electrical connection therebetween and to provide electrical connection between the magnet wire and the matable connector; and the wire housing has an opening with resilient fingers therein, the fingers being dimensioned to receive a splice connector and to secure the splice connector therein.

2. The electrical connector assembly of claim 1, wherein the poke-in tab has a plane, the contact tab being disposed 90 degrees out of the plane of the poke-in tab.

3. The electrical connector assembly of claim 2, wherein the poke-in tab has a mating direction, the tab contact being disposed 90 degrees from the mating direction of the poke-in tab.

4. The electrical connector assembly of claim 1, wherein the wire housing has an opening for receiving the wire contact, slots extend along either side of the opening to allow receipt of the magnet wire therein, a wire tie off post extends from a front face of the wire housing, the wire tie off post being aligned with the slots, the wire tie off post being severed from the wire housing during termination of the wire contact with the magnet wire.

5. The electrical connector assembly of claim 1, wherein a ground shield is disposed between the wire housing and the connector housing to provide protection from magnet wire windings of the motor.

6. An electrical connector assembly for connecting a magnet wire on a motor, comprising:

a first housing to be received within an opening on a wall of a motor housing, the first housing having a first contact therein, the first contact having a poke-in tab and a contact tab for mating with a matable connector;

a second housing having a second contact disposed therein, the second contact having two ends, one of the ends having insulation displacing slots for receiving a magnet wire therein, the other of the ends having a resilient contact finger;

the second housing being matable with the first housing wherein the first contact engages the resilient contact finger to provide electrical connection therebetween and to provide electrical connection between the magnet wire and the matable connector; and the wire housing has an opening with resilient fingers therein, the fingers being dimensioned to receive a splice connector and to secure the splice connector therein.

7. The electrical connector assembly of claim 6, wherein the poke-in tab has a plane, the contact tab being disposed 90 degrees out of the plane of the poke-in tab.

8. The electrical connector assembly of claim 7, wherein the poke-in tab has a mating direction, the tab contact being disposed 90 degrees from the mating direction of the poke-in tab.

9. The electrical connector assembly of claim 6, wherein the wire housing has an opening for receiving the wire contact, slots extend along either side of the opening to allow receipt of the magnet wire therein, a wire tie off post extends from a front face of the wire housing, the wire tie off post being aligned with the slots, the wire tie off post being severed from the wire housing during termination of the wire contact with the magnet wire.

10. The electrical connector assembly of claim 6, wherein a ground shield is disposed between the wire housing and the connector housing to provide protection from magnet windings of the motor.

* * * * *